United States Patent [19]

Foran et al.

[11] Patent Number: 4,512,694

[45] Date of Patent: Apr. 23, 1985

[54] METHOD AND APPARATUS FOR ALIGNMENT OF GEARING

[75] Inventors: Charles D. Foran, Dallas; Jack D. Smith, The Colony, both of Tex.

[73] Assignee: Associated Dynamics, Incorporated, Addison, Tex.

[21] Appl. No.: 344,383

[22] Filed: Feb. 1, 1982

[51] Int. Cl.³ .............................................. B23F 3/00
[52] U.S. Cl. ......................................... 409/12; 409/2; 409/31; 409/51; 29/159.2; 33/179.5 R
[58] Field of Search .................. 409/1, 2, 3, 10, 11, 409/12, 31, 61, 38, 39, 51, 56, 59, 60, 61, 218, 18, 19, 21; 51/95 GH; 29/159.2; 33/179.5 B, 179.5 C, 179.5 D, 179.5 R

[56] References Cited

U.S. PATENT DOCUMENTS

| | | | |
|---|---|---|---|
| 1,639,471 | 8/1927 | Shafer | 51/95 GH |
| 2,345,298 | 3/1944 | Semar | 33/179.5 R |
| 2,367,100 | 1/1945 | Cullman et al. | 409/3 |
| 3,417,510 | 12/1968 | Wildhaber | 51/95 GH |
| 3,651,738 | 3/1972 | Bregi | 409/3 |

Primary Examiner—Z. R. Bilinsky
Assistant Examiner—Daniel W. Howell
Attorney, Agent, or Firm—Hubbard, Thurman, Turner & Tucker

[57] ABSTRACT

A double helical gear set having a pair of driving pinions meshed with a pair of driven gears, respectively, is aligned by providing accurately aligned integral or demountable pinions on one shaft and aligning the driven gears using a fixture which is operable to locate a keyway or other aligning device on each of the driven gears so that the driven gears can be timed or aligned on their support shaft. The fixture has a hub member which fits in the bore of the gear hub and includes a locating pin engageable with opposed flanks of adjacent teeth at corresponding points on the tooth profile such as the pitch point. The fixture includes interchangeable locating pin support members for use in aligning helical gears having different diametral pitches and helix angles. Integral pinions of the opposed helical type are formed on a shaft and aligned with each other by providing aligned locating recesses in the shaft and mounting gear master parts on each end of the shaft which are used for centering a gear hob in the tooth spaces of the gear master parts prior to machining the gear teeth.

24 Claims, 9 Drawing Figures

METHOD AND APPARATUS FOR ALIGNMENT OF GEARING

BACKGROUND OF THE INVENTION

1. Field of the Invention

The present invention pertains to methods and alignment fixtures for use in aligning gears which are to be disposed spaced apart on a shaft and meshed with respective driving or driven gears on a parallel shaft so that the proper mesh and a predetermined load distribution between the two sets of meshed gears may be obtained.

2. Background Art

In the art of power transmission gearing, there are numerous arrangements wherein a shaft is provided with spaced apart driving or driven gears which are meshed with respective gears mounted on an adjacent and parallel shaft. In order to provide a proper mesh, that is a mesh in which all the driving gears are actually transmitting a driving force to the respective driven gears, the gears on the respective shafts must be properly aligned so that when the teeth of one gear are in driving engagement with the associated driven gear, the teeth on the other driving gear or gears are also drivingly engaged with their respective driven gears.

In many applications of relatively large power transmission gears, it is a problem to be able to properly align the gear sets so that a substantially equal or predetermined load distribution is provided. This problem of gear tooth alignment is particularly vexatious for larger gears which, whether cut integral or arranged to be demountable from the supporting shaft, are difficult to align.

One example of relatively large power transmission gearing arrangements wherein alignment has been a problem is in the gearing for large reciprocating piston pumps and similar types of gear drives, wherein the spacing between the adjacent gears on the same shaft is such that there is no practical way to provide an alignment fixture spanning the gap between the gears and providing sufficient accuracy to assure the desired alignment.

In large drilling and well service pumps, for example, it is customary to provide a pinion or jackshaft having spaced apart integral or demountable helical gears, preferably of the opposite hand, which are respectively drivingly engaged with large driven or bull gears mounted on the pump crankshaft. A preferred arrangement of the gearing requires that the driven gears be mounted on the opposite ends of the shaft by interfitting keys or splines. In order to provide proper alignment of the gearing, it has been a practice to fix one of the driven gears on the shaft in mesh with its pinion and then loosely mount the other of the driven gears on the opposite end of the shaft and in mesh with its driving pinion. The pinion shaft is then rotated so that the loosely mounted driven gear seeks a position relative to its supporting shaft which provides proper tooth alignment. The shaft, or preferably the gear, is then removed and a keyway is cut in alignment with the keyway on the other part. The parts are then reassembled with an interfitting key so that both driven gears are fixed to their respective shaft ends and are in driven engagement with the pinions.

The time requirements and inaccuracies associated with the aforementioned technique of aligning large power transmission gears, have made it highly desirable to develop a method for aligning gears which does not require the demounting of the driving or driven gear parts after an initial assembly.

It is also important that the teeth of the other gear set, whether or not the gears are integrally mounted on their shaft, also be properly aligned with respect to each other so that prealignment of the driven gears may be obtained. In this regard prior art methods of cutting integral gears on shafts have been overly time consuming and do not assure proper alignment of the teeth on one gear with the teeth of the other gear formed on the same shaft.

For example, in cutting integral gears spaced apart on a shaft with hobs and other form cutters it has been conventional practice to place alignment marks on the shaft which are used in an effort to visually "center" the gear cutter prior to cutting the respective sets of gear teeth. This method is inaccurate due to the good chance of human error in performing the alignment process. The problems of accurately aligning certain types of cutters such as gear hobs by this technique is compounded by the nonsymmetrical shape of the cutter teeth which precludes accurate visual "sighting in" or centering methods.

Accordingly, there has been a need for improved methods for aligning heavy duty power transmission gearing whereby accurate alignment of the gearing is obtainable without the complex assembly and disassembly procedures associated with prior art techniques. In connection with developing improved methods for aligning gears which are spaced apart on a common shaft, the present invention has also provided improved fixture means particularly adapted for use in manufacturing and aligning opposed or so called double helical gear sets.

SUMMARY OF THE INVENTION

The present invention provides an improved method for aligning power transmission gear sets wherein two or more driving gears are mounted spaced apart on a common shaft and are meshed with respective driven gears also mounted spaced apart on a second shaft. The improved method of the present invention is particularly useful in manufacturing and aligning double helical gear sets although it is contemplated that the method may be utilized for other gearing configurations such as straight spur or bevel gearing.

In accordance with one important aspect of the present invention, there is provided a method for aligning gears which are demountable from a supporting shaft so that the teeth of one gear are aligned in a predetermined relationship with the teeth of a second gear which is mounted on the shaft and spaced apart from the first gear. In accordance with the process of aligning demountable gears, the shaft is provided with keyways or other locating means for the respective gears, which keyways are provided in relatively precise alignment with each other on the shaft.

A corresponding keyway or similar locating means is provided on each one of the gears by using an alignment fixture which locates the gear keyway position with respect to the centerline of a tooth space formed by opposed flanks of adjacent teeth on the gears. In this way two gears which are adapted to be mounted spaced apart from each other on a driving or driven shaft may be positioned on the shaft so that the teeth of one gear are accurately aligned with the teeth of the other gear in a predetermined relationship. Accordingly, the respective gears may be meshed with a pair of driving or driven gears which also have a predetermined alignment whereby improved mesh or timing is obtained with each pair of gears and gear load distribution is enhanced.

In carrying out the improved alignment method for demountable gears, the present invention also provides a timing or alignment fixture for use in providing an alignment marking, keyway, or other locating means on a gear to provide for precise alignment of the teeth of the gear with respect to a shaft or other member on which the gear is to be mounted. The alignment fixture of the present invention is particularly adapted for locating keyways to be cut in the hubs of respective ones of a pair of gears which are to be mounted on a common shaft and with the teeth of one gear in predetermined alignment with the teeth of the other gear. The alignment fixture of the present invention is particularly adapted for use in connection with aligning different sets of helical gears including gear sets with gears of the opposite hand as well as gears having different helix angles or tooth profiles.

In accordance with another important aspect of the present invention, there is provided a method for manufacturing one part of a gear set comprising a shaft having spaced apart integral pinion gears formed thereon and wherein the teeth of one pinion are aligned with the teeth of the other pinion in a predetermined and precise relationship. The preferred method of manufacturing integral double pinion shaft arrangements is adapted for use in cutting the gear teeth of spaced apart gears or pinions with a form cutting tool such as a milling cutter or hob having a predetermined cutting profile thereon. The form cutting tool is aligned with the shaft for cutting a series of teeth to form a gear integral with the shaft by mounting on the shaft a master gear part having at least one gear tooth space cut to form opposing gear tooth flanks. The master gear part is mounted on the shaft by a fixture which locates the master gear part in a predetermined position with respect to the shaft. The shaft or workpiece is then mounted in the gear cutting machine and the cutter is aligned with the flanks of the tooth space of the master gear part to provide a properly centered relationship of the cutter with respect to the flanks, and to provide the proper cutting angle in the case of helical gears.

After a first gear is cut the shaft is then removed from the gear cutting machine and the abovementioned process is repeated for the other gear which is to be integrally formed on the shaft. If the gears are helical and of the opposite hand, then a second master gear part having the same hand as the second gear is provided.

The improved method for forming a pair of integral cut gears further includes provision of spaced apart alignment recesses in the shaft which are adapted to receive an alignment pin mounted on the aforementioned fixture which supports and aligns the gear master parts with respect to the shaft. Since the recesses in the shaft may be accurately located with respect to each other in accordance with conventional manufacturing processes, the location of the gear master parts and, consequently, the spaced apart sets of gear teeth formed on the shaft are accurately aligned in a predetermined relationship.

Those skilled in the art will appreciate other advantages and superior features of the present invention upon reading the detailed description which follows in conjunction with the drawings.

DESCRIPTION OF THE PREFERRED EMBODIMENTS

Figure 1:
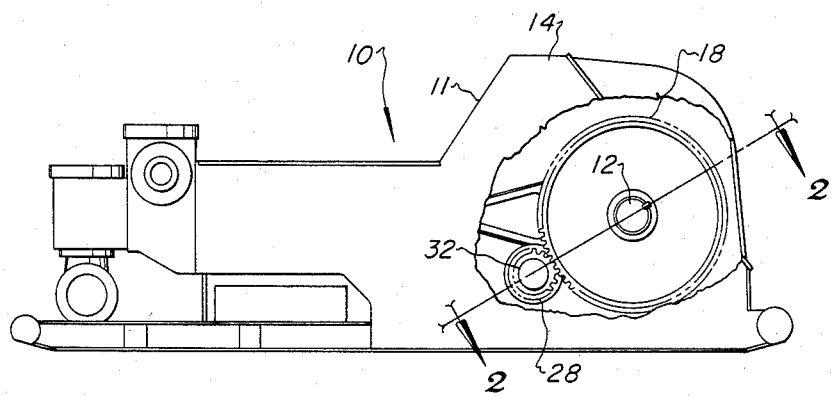
FIG. 1 is a side elevation view of a machine comprising a high pressure reciprocating plunger pump including a portion of a drive gearing arrangement therefor.

In the description which follows, like parts are marked throughout the specification and drawings with the same reference numerals, respectively. The drawings are not necessarily to scale and the scale of certain parts may be exaggerated to illustrate the details of the invention.

Figure 2:
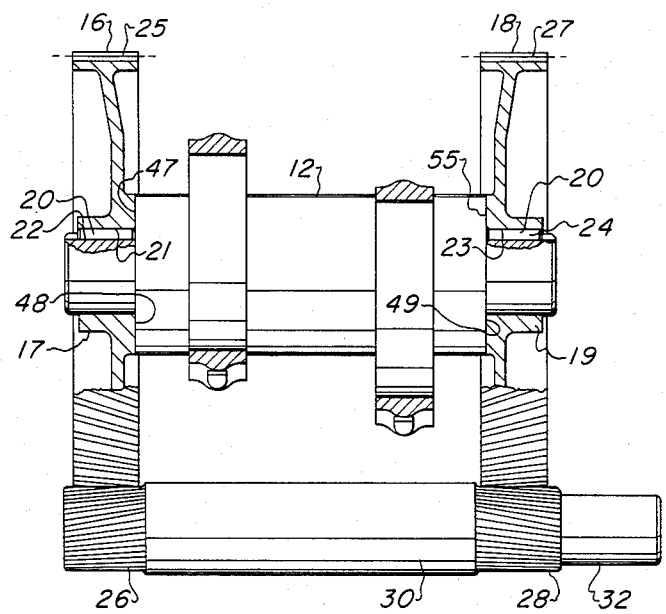
FIG. 2 is a view taken substantially along the line 2—2 of FIG. 1 and further illustrating the drive gearing arrangement.

The present invention contemplates the provision of properly aligned gear sets for parallel shaft power transmission gear drives and particularly of the opposed helical configuration wherein a pair of spaced apart and opposed helical gears are mounted on one shaft and are meshed with respective driving or driven gears mounted spaced apart on a second shaft. One such application of power transmission gearing wherein relatively even load distribution between the respective sets of meshed gears is desired is illustrated in FIGS. 1 and 2. Referring to FIGS. 1 and 2, there is illustrated a high pressure reciprocating piston pump, generally designated by the numeral 10, and comprising a power end 11 having a crankshaft 12 rotatably mounted in a housing or frame 14. The crankshaft 12 is adapted to drive reciprocating pump plungers, not shown, through a conventional connecting rod and crosshead mechanism, also not shown. FIG. 2 illustrates the general arrangement of the pump drive gearing but with the supporting bearings and frame structure, not shown. Referring to FIG. 2, in particular, the crankshaft 12 is provided with driven gears 16 and 18 which are mounted spaced apart on the shaft and are secured in driving engagement with the shaft by respective drive keys 20. The keys 20 are interfitted in corresponding keyslots or keyways 21 and 23 formed in respective hubs 17 and 19 of the gears and in cooperating aigned keyways 22 and 24 formed in the shaft 12. The crankshaft 12 may be formed in accordance with known manufacturing practices and the longitudinal alignment of the keyways 22 and 24 may be provided with substantial accuracy. The keyways 22 and 24 may, for example, be cut on a milling machine whereby the set up of the shaft on the machine is not disturbed and the machine table, on which the shaft is mounted, is merely moved longitudinally with respect to the cutter head from one cutting position to the other. The gears 16 and 18 may be retained on the respective shaft ends by various means in accordance with conventional machine design techniques.

The gears 16 and 18 are drivenly engaged with respective integral gears or pinions 26 and 28 formed on a shaft 30. The shaft 30 may include a reduced diameter portion 32 extending from one end of the shaft wherein a suitable prime mover, not shown, may be drivably connected to the pump 10. The aforementioned gears are of the helical type and the gears 16 and 26 are of the opposite hand with respect to each other and with respect to the gears 18 and 28. With an arrangement such as illustrated in FIG. 2, the axial thrust forces caused by the transmission of driving forces between the gear sets oppose each other and can be substantially balanced.

In a gear drive arrangement of the general type illustrated in FIG. 2, it is important that the teeth of the gears 26 and 28 be aligned with each other in a predetermined relationship and that the gears 16 and 18 be aligned or timed to receive substantially equal driving forces from the gears 26 and 28. Since the gears 16 and 18 are of relatively large diameter, and since the design of machines such as the pump 10 require that the gears be demountable from the shaft 12, it has heretofore been a problem to provide proper alignment of the gears 16 and 18 so that the driving load from the shaft 30 is relatively evenly distributed between the gears 26 and 28 and the respective driven gears. Although the keyways in the shaft 12 may be rather easily accurately aligned with each other in accordance with conventional machining techniques, one of which has been previously described, it has been more difficult to provide a predetermined alignment of the keyways in the gear hubs 17 and 19 with respect to the teeth 25 and 27 on the respective gears.

As previously mentioned, one prior art technique for aligning the gears 16 and 18 is to provide a keyway indiscriminately located in the hub of the gear 18, for example, and then proceed to mount the gear on the shaft 12 and meshed with gear 28. The gear 16 is loosely mounted on the opposite end of the shaft in mesh with the gear 26. The shaft 30 is then rotated to mesh the gears 26 and 28 with the respective gears 16 and 18 whereby the gear 16 adjusts its rotational alignment with respect to the shaft 12. The hub 17 is then marked to indicate the location of the keyway 22 on the shaft, the gear 16 is removed for cutting the keyway 21 in the hub in accordance with the marked location, and the gear is then replaced on the shaft with a key 20 interfitted between the shaft and the gear.

The aforedescribed process is relatively time consuming and is difficult to carry out particularly if field replacement of one of the gears 16 or 18 or the shaft 30 is required. If the shaft with the integral pinions must be replaced, and the pinions are not accurately aligned, then the gears 16 or 18 must be retimed or reset with respect to each other also. Accordingly, it will be appreciated that it is also important that a predetermined alignment of the gears 26 and 28 be provided for replacement shafts so that the gears 16 or 18 do not require retiming.

If the teeth 25 of gear 16 can be properly aligned with a keyway cut in the hub 17, and the teeth 27 of gear 18 can be aligned in the same manner with a keyway cut in the hub 19, then the gears 16 and 18 may be mounted on a shaft with accurately aligned keyways such as the shaft 12 with the respective sets of gear teeth in relatively precise alignment with each other. Assuming that the gears 26 and 28 have their respective sets of teeth properly aligned, one set with respect to the other, the complete gear set may be assembled with the expectation that a fairly even distribution of the driving load will be obtained through the respective sets of meshed gears. In accordance with the present invention, an improved process and apparatus providing for alignment of the gears 16 and 18 will now be described.

Figure 3:
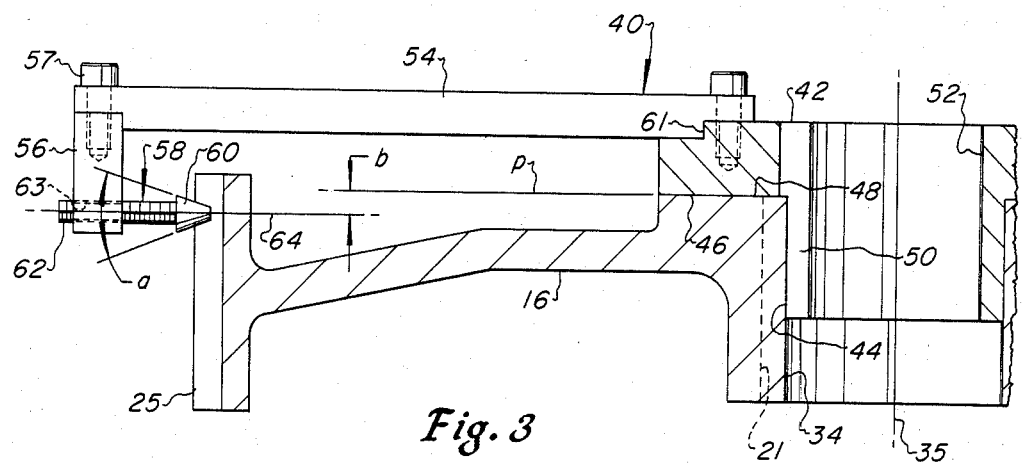
FIG. 3 is a side elevation, partially sectioned, of an improved gear alignment fixture in accordance with the present invention.
Figure 4:
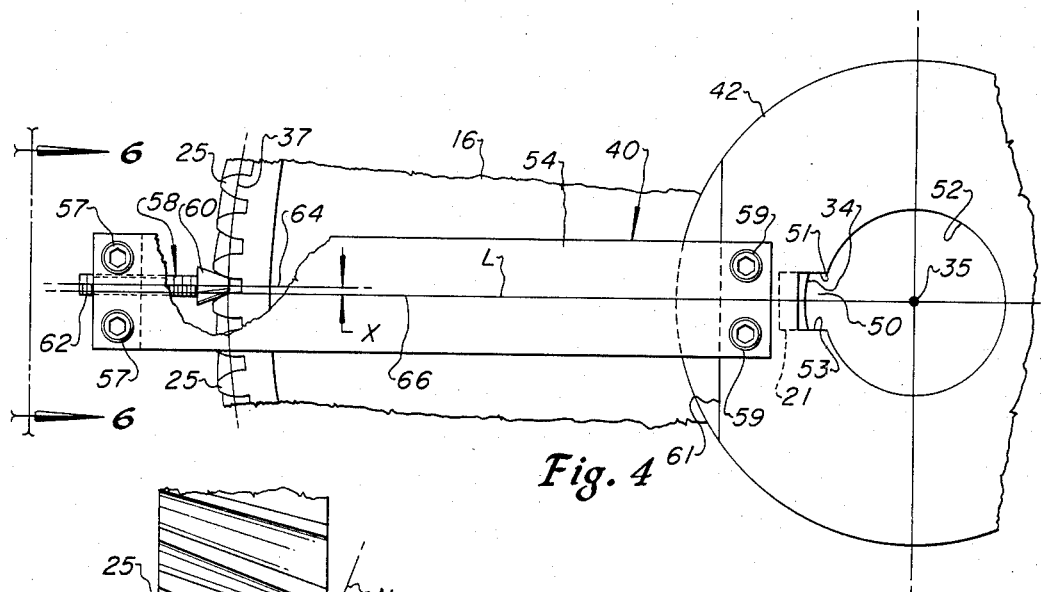
FIG. 4 is a plan view of the alignment fixture illustrated in FIG. 3.

Referring to FIGS. 3 and 4, in particular, the gear 16 is shown by way of example and is illustrated in partial diametral section showing the hub 17 provided with a central longitudinal bore 34. The axis 35 of the bore 34 may be accurately located with respect to the geometric parameters of the teeth 25. For example, the pitch circle 37 of the teeth 25 normally has its center coincide with the axis 35. Accordingly, it is only necessary to provide for a predetermined point on the flanks of the teeth 25 to be aligned with a reference such as the centerline of the keyway 21 to be formed in the hub 17.

In order to locate the keyway 21 there is provided, in accordance with the present invention, a novel alignment fixture, generally designated by the numeral 40 in FIGS. 3 and 4. The fixture 40 includes a hub part 42 having a pilot diameter portion 44 which is machined to fit closely within the bore 34 of the gear hub 17 and have a central axis coincident with the axis 35. The hub part 42 also includes a planar reference surface 46 which is perpendicular to the longitudinal axis of the pilot diameter portion 44. The reference surface 46 is adapted to be engageable with a corresponding planar reference surface 48 provided on the hub 17, and which is also perpendicular to the axis 35.

The hub part 42 also includes a longitudinal rectangular keyway 50 which is cut to a depth sufficient such that a slot is formed in the pilot diameter portion 44 whereby access to the surface of the bore 34 may be obtained from a central bore 52 formed in the hub part. Accordingly, with the hub part 42 in the position illustrated in FIG. 3, reference lines may be scribed on the hub inner wall surface defining the bore 34 along the intersection of the sidewalls 51 and 53 of keyway 50 with the bore 35 once the proper location of the keyway 21 has been determined.

Referring further to FIGS. 3 and 4, the fixture 40 includes a radially extending arm 54 having disposed at the distal end thereof, a removable support block 56 for a gear tooth locating gauge member generally designated by the numeral 58. The gauge member 58 includes a head part 60 formed as a truncated cone shaped member having an included angle "a", as indicated, and preferably being equal to twice the pressure angle of the gear teeth 25. The head part 60 is thus proportioned such that the gauge member 58 may be centered between adjacent teeth by contacting the tooth flanks at the pitch circle. Alternatively, the head part 60 could be formed as a suitably sized spherical member so that the gauge member 58 would be located in a centered position by contacting corresponding points on the flanks of adjacent gear teeth. The member 58 is provided with a threaded shank portion 62 which is engaged with the support block 56 by means of a tapped hole 63 through the block. The gauge member 58 is disposed on a centerline 64, as indicated in FIG. 4, which is offset from and parallel to the centerline 66 of the arm 54. The centerline 66 lies in a plane L which bisects the keyway 50 and also includes the axis 35. The centerline 64 is also disposed at a predetermined axial dimension, with respect to the axis 35, from a plane P which includes the surface 46, as indicated by the dimension "b" in FIG. 3.

Figure 6:
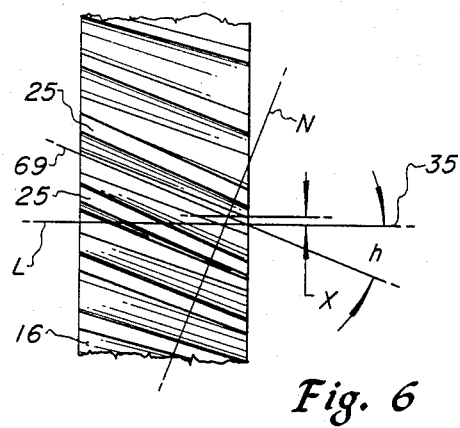
FIG. 6 is a detail view of a portion of a gear taken from line 6—6 of FIG. 4 and illustrating the location of the actual center point of a tooth space with respect to a plane which includes the axis of the gear and bisects a locating keyway to be formed in the gear.

FIG. 6 illustrates a portion of a right hand helical gear such as the gear 16. FIG. 6 also illustrates the amount of offset of the centerline 64 with respect to plane L, which includes both the axis 35 and centerline 66, and for gear 16 having a helix angle "h". The helix angle h is the angle formed between a line 69 defining the center of a space between adjacent teeth 25 and the longitudinal axis 35 of the gear. Providing for an accurate centering of the gauge member 58, with respect to the centerline 66 or plane L, requires that the centerline 64 of the gauge member be located at the center of the tooth space as viewed in a plane N normal to the centerline 69 of a tooth space formed between teeth 25. Accordingly, the true center of the tooth space on the pitch circle 37 which will correctly locate the member 58 is offset from the center of the tooth space, as viewed in a transverse plane perpendicular to the axis 35, by the distance "x". The dimension x is equal to half of the normal circular pitch of the particular gear to be measured multiplied by the sine of the helix angle h and by the tangent of the helix angle h. The normal circular pitch is determined by dividing the transverse circular pitch, as measured in the plane of rotation of the gear, by the secant of the helix angle. The normal circular pitch is also defined as the mathematical constant pi divided by the diametral pitch (DP). Accordingly, for a gear having a particular diametral pitch and helix angle, the distance x that the centerline 64 of the gauge member 58 must be offset from the centerline 66 and plane L may be determined in accordance with the abovenoted relationships. For example, the distance x may be expressed as being equal to the quantity (0.5)(pi/DP)(sine h)(tangent h).

Figure 5:
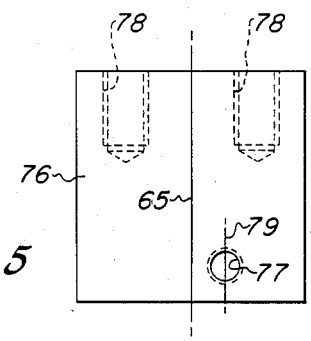
FIG. 5 is a detail of an interchangeable gauge part support block for use with the alignment fixture illustrated in FIGS. 3 and 4.

One way to provide for use of the fixture 40 with gears of various diametral pitch and helix angle is to provide interchangeable support blocks such as the block 56 which is secured to the arm 54 by precision located screws 57, as shown in FIGS. 3 and 4. FIG. 5, for example, illustrates a second support block 76 having precision spaced apart tapped holes 78 for receiving the screws 57 to secure the support block to the arm 54 in the same manner as the support block 56. The support block 76 also has a precision tapped hole 77 for receiving the shank 62 of the gauge member 58. The axis 79 of the tapped hole 77 is offset from the centerline 65, or midpoint between the tapped holes 78, by an amount corresponding to the distance x which may be different from that of the support block 56 in accordance with the particular gear which is to be measured using the support block 76 with the alignment fixture 40.

In order to accommodate gears having different sizes of the central mounting bore 34, the hub part 42 may also be interchanged with hub parts having the correct pilot diameter portion. In this regard, the arm 54 is removably mounted on the hub 42 by screws 59 and is located by a shoulder 61 on the hub part. Accordingly, a modular fixture 40 may be realized for accurately locating a keyway or other alignment means for a gear such as the gear 16 but having different tooth geometry and hub bore. It is basically only necessary that in providing for locating keyways for a set of gears to be meshed with another set of gears having a predetermined alignment, that the dimension "b" be maintained between the reference surface 46 and the centerline 64 of the gauge member 58 for all gears of the set.

The process of determining the correct location of a keyway on a pair of gears such as the gears 16 and 18 merely requires mounting the fixture 40 in the bore of the gear hub so that the surfaces 46 and 48 are contiguous and the gauge member head 60 is snugly located in a tooth space between adjacent teeth and engaged with the opposed tooth flanks defining the tooth space. By making the cone angle of the truncated cone shaped head 60 equal to twice the pressure angle of the tooth profile, the head will engage the opposed tooth flanks at the pitch circle of the teeth, as indicated in FIG. 4, upon axially adjusting the head by rotating the shank 62. Once the fixture 40 has been centered, reference lines may be scribed on the surface of the bore 34 in alignment with the side surfaces 51 and 53 of the keyway 50 for use by a machinist in machining the keyway 21 in the hub 17.

The fixture 40 is then removed from the gear 16 and the process repeated for the gear 18. However, since gear 18 is of the opposite hand, the support block 56 is first removed from the arm 54 and rotated 180° and then remounted on the arm so that the centerline 64 is on the opposite side of the centerline 66 and plane L from that shown in FIG. 3. The gauge member 58 must also, of course, be removed from the support block 56 and reinserted in the opposite end of the hole 63. The centerline 64 is now located a distance equal to 2x from its first position or a distance from its first position equal to (pi/DP)(sine of helix angle)(tangent of helix angle). Accordingly, keyways may be cut in a pair of gears such as the gears 16 and 18 so that the gears may be mounted on a shaft having keyways accurately aligned with each other and whereby the gears 16 and 18 will correctly mesh with a pair of gears such as the pinions 26 and 28 assuming that the pinions are correctly aligned with each other.

For a particular set of gears to correctly mesh with the gears 16 and 18, the gears 16 and 18 are required to be located axially against reference surfaces on their supporting shaft or some other locating surface means. The shaft 12 is provided with transverse locating surfaces 47 and 49, FIG. 2, for abutting the surfaces on the gears 16 and 18 such as the surface 48 and a corresponding surface 55 on gear 18. Moreover, if the gears 16 and 18 are to be meshed with a pair of gears which are in themselves demountable with respect to their supporting shaft, the abovedescribed process for locating such a pair of gears on the shaft may be utilized also. That is, the process and fixture described above may be used for an entire gear set to assure that both pairs of gears are properly aligned to provide an accurate mesh in which a substantially equal or predetermined load distribution between spaced apart pairs of gears may be obtained.

Figure 9:
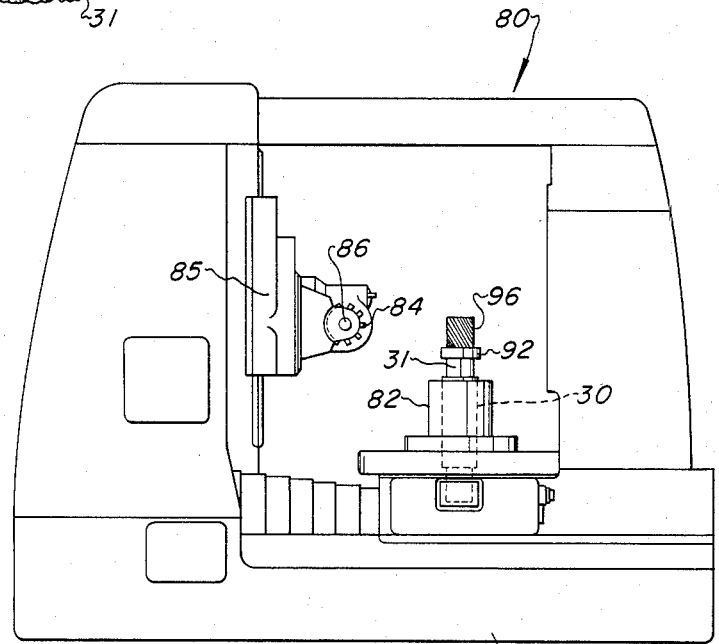
FIG. 9 is a side elevation view of a typical machine for cutting helical gears on a shaft, such as the shaft illustrated in FIG. 7, and utilizing a method and apparatus in accordance with the present invention.

In a gear set such as the gear set described in conjunction with FIGS. 1 and 2 of the drawings, it is preferred to provide the pinions 26 and 28 to be integrally formed on the shaft 30. The teeth of the gears 26 and 28 are preferably formed by a process using a continuous form cutter such as a hob although the improved method of manufacturing the gears 26 and 28 contemplates the use of other types of form cutting tools such as form milling cutters or the like. Referring briefly to FIG. 9, there is illustrated a type of gear cutting machine which may be used in conjunction with the method of the present invention. The machine illustrated in FIG. 9, and generally designated by the numeral 80, is a gear hobbing machine of a type which is commercially available. One type of machine which may be used in conjunction with the improved method of the present invention is a model L-1200 gear hobbing machine manufactured by Liebherr Werkzeugmaschinen, 8960 Kempten/Allgau, West Germany. The hobbing machine 80 includes a frame 81 on which a chuck or head member 82 is rotatably mounted and adapted to receive a workpiece such as the shaft 30 so that one end of the shaft projects generally vertically upward and is disposed in proximity to a rotatable hob 84. The hob 84 is mounted on a spindle 86 which may be positioned with respect to the shaft 30 to cut gear teeth of the gears 26 and 28 at a predetermined helix angle. The hob 84 is rotated in timed relation with rotation of the head 82 so that the teeth of the gear 26, for example, are cut in a continuous operation by rotating the hob 84 and feeding the hob axially on its carrier 85 with respect to the shaft 30 while at the same time rotating the shaft. The hob 84 and the head 82 are interconnected by a precision drive gear train to maintain the proper feeding relationship between the hob and the shaft 30.

One problem associated with cutting teeth of a gear such as the gears 26 and 28 pertains to the inability to accurately align the form cutter with a predetermined point on the shaft 30 so that the respective sets of gear teeth forming gears 26 and 28 are accurately aligned with each other. It is particularly difficult to locate the hob 84 with respect to a predetermined point on the shaft 30 to commence cutting the gear 26, for example. Moreover, when the shaft 30 is removed from the head 82, turned end for end, and then replaced in the head for cutting the gear 28 on the opposite end, it is further particularly difficult to locate the teeth of the gear 28 in predetermined aligned relationship with the teeth of the gear 26. This is due to the fact that the gear 26 is now not accessible to a gauging or alignment fixture since that end of the shaft 30 is disposed in the head 82. In any case, it is particularly difficult to accurately align or center a form cutting tool such as the hob 84 even when the predetermined angular relationship with respect to the axes of rotation of the hob and the shaft 30 are determined.

Heretofore, it has been conventional practice to merely place marks on a shaft, such as the shaft 30, which marks are axially aligned with each other to be used as reference lines for locating the hob 84, before commencing cutting of the gear. However, with the accuracy required of parallel shaft gear drives of the type described herein, and further in order to utilize the method and apparatus described hereinabove for aligning the gears 16 and 18, the gear teeth of the gears 26 and 28 must be accurately aligned with each other. In this regard, an improved process for aligning sets of teeth of a pair of integrally cut gears formed spaced apart on a shaft has been devised in accordance with the present invention for use with a machine of the type shown in FIG. 8 as well as in other types of form cutting operations such as, for example, cutting gears with a form milling cutter on a universal type milling machine.

Figure 7:
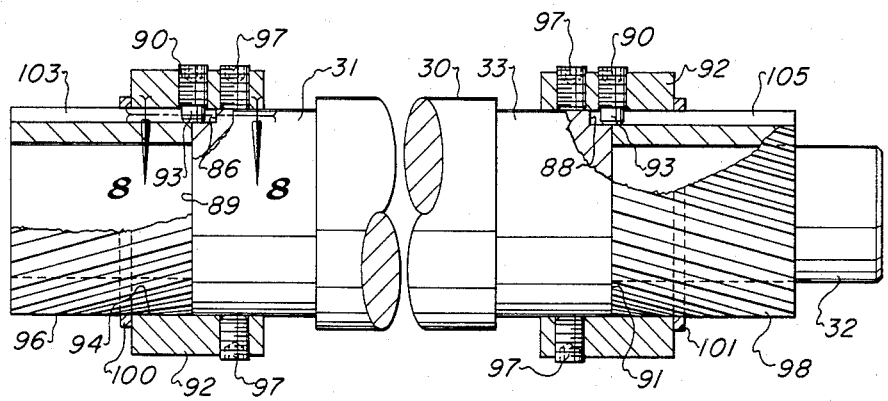
FIG. 7 is a longitudinal side elevation, partially sectioned, of an integral pinion shaft having gear cutter alignment fixtures mounted thereon in accordance with the present invention.

Referring now to FIG. 7, the shaft 30 is illustrated prior to cutting teeth on the opposite end portions which will form the gears 26 and 28. The shaft 30 is provided with opposed cylindrical portions 31 and 33 which are adapted to be machined to provide the gears 26 and 28 using the hobbing machine shown in FIG. 9. The method of providing accurate predetermined alignment of the teeth of the gears 26 and 28 includes providing the shaft 30 with spaced apart axially aligned recesses 86 and 88, as shown in FIG. 7. The recesses 86 and 88 are open to respective end faces 89 and 91 of the shaft and may be formed in the same manner as conventional keyways. The recesses 86 and 88 may be formed, for example, using a milling cutter with the shaft 30 mounted on a milling machine whereby the recesses may be formed of a predetermined size and shape and accurately aligned with each other in the same manner as the keyways are aligned for the shaft 12.

As shown in FIG. 7, the recesses 86 and 88 are adapted to receive a locating pin 90 which is secured in a sleeve-like locating fixture generally designated by the numeral 92. The locating pin 90 is preferably formed as a socket head type screw having an end portion 93 of predetermined diameter and which projects into the respective recesses 86 and 88 and is dimensioned to fit snugly between the sidewalls of the recesses. The fixture 92 comprises a generally cylindrical sleeve member which is formed with a bore 94 dimensioned to be accurately positioned on the shaft portions 31 and 33. In the arrangement shown in FIG. 7, two fixtures 92 are provided at opposite ends of the shaft and are secured thereon by spaced apart socket head type retaining screws 97. In carrying out the method of the present invention however, only one fixture 92 would be required for gears of a particular diameter.

The fixtures 92 are also adapted to support respective gear master parts 96 and 98 which have the same tooth geometry and configuration as the gears 26 and 28, respectively. The gear master parts 96 and 98 may each be provided with a cylindrical collar portion 100 and 101, respectively, for locating the fixtures 92 so that the pin end portions 93 project into tooth spaces 103 and 105 on the respective gear master parts 96 and 98. As indicated, by way of example in FIG. 8, the pin end portion 93 is preferably formed to be in snug fitting relationship in the recess 86 or 88 and the recesses are formed to have a width corresponding to the width of a tooth space 103 or 105 at the tooth pitch circle.

Figure 8:
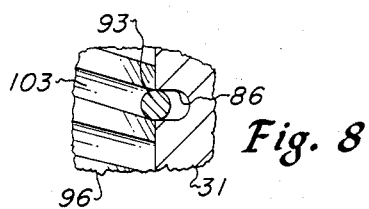
FIG. 8 is a detail section view taken generally along the line 8—8 of FIG. 7.

Accordingly, from the foregoing description, as well as viewing the drawing FIGS. 7 and 8, those skilled in the art will appreciate that the gear master parts 96 and 98 may be mounted on the shaft 30 adjacent the shaft portions 31 and 33 with the respective sets of gear teeth on the gear master parts accurately aligned with each other thanks to the alignment or locating fixtures 92 and by providing the shaft 30 with the locating recesses 86 and 88. Depending on the particular machine arrangement for cutting gears on the shaft 30, the gear master parts 96 and 98 may or may not be mounted on the shaft at the same time. In the machine illustrated in FIG. 9, the respective gear master parts are mounted only on the end of the shaft which is in proximity to the hob cutter 84 at the time the gear cutting operation is to be formed. For example, in machining gear teeth on the shaft portion 31, the shaft 30 is first mounted in the head 82. The locating fixture 92 together with the gear master part 96 is then mounted on the shaft 30 in the relationship as shown in FIG. 7.

With the gear master part 96 mounted on the shaft 30, as shown, and the shaft disposed in the head 82, the hob 84 is then adjusted so that it is centered with respect to the precut teeth of the gear master part and properly oriented as regards the gear helix angle. The gear master part 96 and the fixture 92 may then be removed from the shaft 30 and feeding of the cutter commenced to cut the teeth of the gear 26. When the cutting operation is completed, the shaft is, of course, removed from the head 82, turned end for end, and replaced in the head. The fixture 92, or a duplicate thereof, is then mounted on the tooth spaces such as the space 105 of the gear master part 98 is then repeated so that the cutter is correctly aligned for cutting teeth of the gear 28 in accordance with the prescribed gear geometry. Again, the gear master part 98 and the fixture 92 are removed from the shaft 30 and the machining process is carried out in a conventional manner.

Since the hob 84 has been accurately located with respect to the teeth on the opposite end of the shaft, that is the teeth of the gear 28, the gears 26 and 28 are accurately aligned axially with each other upon completion of the gear cutting process. Accordingly, there is no need to attempt to locate the hob 84 with respect to an indicating mark or the like on the shaft 30 as the means of locating the cutter with respect to the shaft.

The abovedescribed process is also normally carried out by providing some form of erasible indicia on the flanks of the gear teeth of the gear master parts 96 and 98. For example, a typical dye used in machine layout and gauging operations may be applied to the flanks of the teeth of the gear master parts whereby upon locating the teeth with respect to the hob 84 and slowly revolving the hob, fine adjustment of the cutter position may be obtained by viewing the scuffing of the sides of the cutter teeth on the flanks of the gear teeth of the gear master parts. In this way, the hob 84 may be accurately centered with respect to the gear master part and more accurate alignment of the gears cut on each end of the shaft 30 may be assured. The dimensional tolerances of the shaft portions 31 and 33 with respect to the bore 94 of the fixture 92 as well as the dimensional tolerance relationship between the locating pin 90 and the recesses 86 and 88 may be controlled to be a minimum in accordance with conventional machining practices whereby the use of the gear master parts to align the hob 84 for cutting the gears 26 and 28 will provide accurately aligned gear teeth.

Accordingly, the overall method of manufacturing and aligning a gear set, such as the set of opposed helical gears illustrated in FIG. 2, provides for improved power transmission gearing arrangements wherein the driving load transferred from the shaft 30 to the shaft 12, or vice versa, will be substantially evenly distributed between the respective gear pairs 16-26 and 18-28.

Although the method and apparatus of the present invention has been described in connection with a set of opposed helical gears, those skilled in the art will appreciate that the invention may be used with substantially any set of matched gearing wherein it is desired to provide accurate alignment between two gears on one shaft so that a substantially evenly distributed or a predetermined distribution of the driving load is applied to respective gears on a second shaft. Moreover, the method and apparatus disclosed herein may be used with regard to gear arrangements where more than two gears are connected to a particular shaft. Those skilled in the art will further appreciate that various substitutions and modifications may be made to the specific embodiments disclosed herein without departing from the scope and spirit of the present invention as recited in the appended claims.

What we claim is:

1. A method of aligning at least one set of gears of a gear drive arrangement having a first set of gears mountable spaced apart on a first shaft so that each of said gears of said first set may be meshed with respective ones of a second set of gears mounted spaced apart on a second shaft substantially parallel to said first shaft whereby a driving load is transferred substantially evenly from said first set of gears to said second set of gears, said method comprising the steps of:
   (a) providing one of said shafts with one of said sets of gears formed integral with said one shaft and aligned with each other so that the teeth of one of said gears of said one set are positioned in a predetermined relationship with the teeth of the other of said gears of said one set by:
      (1) providing said one shaft with opposed recess means of predetermined dimensions formed spaced apart on said one shaft in predetermined alignment with each other;
      (2) providing a first gear master part having at least one set of opposed tooth flanks forming at least one tooth space of predetermined proportions;
      (3) providing a first fixture for holding said first gear master part and mountable on said one shaft, said first fixture including locating pin means thereon;
      (4) mounting said first gear master part on said shaft in a predetermined position as determined by one of said recess means;
      (5) mounting said first fixture on said one shaft with said locatingl pin means disposed in said one of said recess means and in a tooth space for locating said first gear master part in a predetermined position with respect to said one shaft prior to locating a cutting tool in said tooth space;
      (6) premarking said tooth flanks of said first gear master part to indicate contact with said cutting tool and adjusting the position of said cutting tool with respect to said tooth flanks so as to substantially center said cutting tool in a tooth space on said first gear master part;
      (7) positioning said cutting tool in said tooth space to locate said cutting tool with respect to at least one of said flanks and said one shaft for cutting said teeth of one of said gears of said one set in a predetermined alignment with respect to said one shaft;
   (b) providing the other of said shafts with spaced apart alignment means aligned with each other;
   (c) providing all gears of said other set with hubs for mounting said gears of said other set on said other shaft;
   (d) providing a second fixture including means engageable with corresponding points on the profile faces of adjacent gear teeth, said second fixture including means for locating a reference point on said hubs;
   (e) mounting said second fixture on each of said gears of said other set and marking each hub to locate alignment means on each hub on the basis of the location of said means on said second fixture for locating said reference point on said hub;

(f) providing alignment means in each of said gears of said other set based on the location of said marks; and (g) mounting said gears of said other set on said other shaft with said alignment means on said gears of said other set aligned with respective alignment means on said other shaft.

2. The method set forth in claim 1 wherein:
said alignment means on said other shaft comprise spaced apart axially extending keyways, and said method comprises the step of:
forming keyways in said respective hubs in accordance with said marking on said hubs.

3. The method set forth in claim 1 wherein:
said gears of said first and second sets are helical.

4. The method set forth in claim 1 or 3 wherein:
said gears of said other set are each provided with a reference surface on said hub and said fixture includes a corresponding reference surface engageable with said reference surface on said hub, said corresponding reference surface for a given set of gears being located in a plane a predetermined distance from a plane which includes the central axis of said means on said fixture engageable with said adjacent gear teeth.

5. The method set forth in claim 4 wherein:
said other shaft is provided with spaced apart transverse reference surfaces cooperable with said reference surfaces on said hubs, respectively, for locating said gears of said other set axially on said other shaft.

6. The method set forth in claim 4 wherein:
the helices of the teeth of respective gears of said sets are of the opposite hand, and said method includes the step of moving said means on said fixture engageable with adjacent gear teeth with respect to a reference point on said fixture a distance substantially equal to (pi/DP)(sine h)(tangent h) when locating said means on said fixture for locating a reference point on a gear of the opposite hand with respect to a previously marked gear, wherein DP=the diametral pitch for the gears of said set and h is the helix angle of the gears of said set.

7. The method set forth in claim 1 together with the step of:
cutting one of said gears on said one end of said one shaft.

8. The method set forth in claim 7 together with the step of:
removing said first gear master part and said first mixture for holding said first gear master part from said one shaft prior to cutting said one gear.

9. The method set forth in claim 7 wherein:
said cutting tool comprises a rotatable hob and said one gear is cut using said hob mounted on a gear cutting machine including means for supporting said one shaft for rotation in timed relation with rotation of said hob for cutting said one gear.

10. The method set forth in claim 9 together with the steps of:
preparing said one shaft for cutting a gear on the opposite end thereof by:
providing a second gear master part having at least one tooth space formed by opposed gear tooth flanks formed at a helix angle of the opposite hand with respect to said at least one tooth space formed on said first gear master part;
mounting said second gear master part on the opposite end of said one shaft using said first fixture for holding said second gear master part; and
locating a tooth space on said second gear master part with respect to said one shaft by providing said locating pin interfitted in a tooth space on said second gear master part and recess means on said opposite end of said one shaft.

11. The method set forth in claim 10 wherein:
said one shaft is removed from said support means on said machine, turned end for end and remounted on said support means prior to mounting said second gear master part on said one shaft.

12. The method set forth in claim 10 together with the steps of:
positioning said cutting tool in a tooth space in said second gear master part to locate said cutting tool with respect to at least one of said flanks of a tooth space of said second gear master part for cutting teeth of the other gear of said one set in predetermined alignment with respect to said one gear of said one set; and
cutting said teeth on said other gear of said one set.

13. The method set forth in claim 1 or 10 wherein:
said first fixture for holding said gear master part comprises a cylindrical sleeve having bore means for locating said sleeve on said one shaft and said gear master part with respect to said one shaft, and said locating pin is threadedly mounted on said sleeve and projecting into said bore means.

14. In the manufacture of gears which are integrally formed spaced apart on a shaft using a form cutting tool, the method of providing for predetermined alignment of the teeth of one gear with the teeth of another gear on said shaft comprising the steps of:
providing said shaft with opposed recess means of predetermined dimensions formed spaced apart on said shaft in predetermined alignment with each other;
providing a first gear master part having at least one set of opposed tooth flanks forming at least one tooth space of predetermined proportions;
providing a fixture mountable on said shaft for holding said first gear master part on said shaft, said fixture including locating pin means thereon;
mounting said fixture on said shaft with said locating pin means disposed in said one of said recess means and in a tooth space on said first gear master part for locating said first gear master part in a predetermined position with respect to said shaft prior to locating said cutting tool in a tooth space;
mounting said first gear master part on said shaft in a predetermined position as determined by one of said recess means;
premarking said opposed tooth flanks to indicate contact with cutting tool; and
positioning said cutting tool in a tooth space and adjusting the position of said cutting tool with respect to said opposed tooth flanks so as to substantially center said cutting tool in said tooth space on said first gear master part to locate said cutting tool with respect to at least one of said flanks and said shaft for cutting said teeth of one of said gears in predetermined alignment with respect to said shaft.

15. The method set forth in claim 14 together with the step of:
cutting one of said gears on said shaft.

16. The method set forth in claim 15 together with the step of:
   removing said first gear master part and said fixture from said shaft prior to cutting said one gear.

17. The method set forth in claim 16 wherein:
   said cutting tool comprises a rotatable hob and said one gear is cut using said hob mounted on a gear cutting machine including means for supporting said shaft for rotation in timed relation with rotation of said hob for cutting said one gear.

18. The method set forth in claim 17 together with the steps of:
   preparing said shaft for cutting a gear on the opposite end thereof by;
   providing a second gear master part having at least one tooth space formed by opposed gear tooth flanks formed at a helix angle of the opposite hand with respect to said at least one tooth space formed on said first gear master part;
   mounting said second gear master part on the opposite end of said shaft using said fixture for holding said second gear master part; and
   locating a tooth space on said second gear master part with said locating pin interfitted in a tooth space and recess means on said opposite end of said shaft.

19. The method set forth in claim 18 wherein:
   said shaft is removed from said support means on said machine, turned end for end and remounted on said support means prior to mounting said second gear master part on said shaft.

20. The method set forth in claim 19 together with the steps of:
   positioning said cutting tool in a tooth space in said second gear master part to locate said cutting tool with respect to at least one of said flanks of a tooth space of said second gear master part for cutting teeth of the other gear of said one set in predetermined alignment with respect to said one gear of said one set; and
   cutting said teeth on said other gear of said one set.

21. The method set forth in claim 14 or 18 wherein:
   said fixture for holding said gear master part comprises a cylindrical sleeve having bore means for locating said sleeve on said shaft and said gear master part with respect to said shaft, and said locating pin is threadedly mounted on said sleeve and projecting into said bore means.

22. In the manufacture of gears which are integrally formed spaced apart on a shaft using a form cutting tool, the method of providing for predetermined alignment of the teeth of one gear with the teeth of another gear on said shaft comprising the steps of:
   providing said shaft with opposed locating means of predetermined dimensions formed spaced apart on said shaft in predetermined alignment with each other;
   providing a first gear master part having at least one set of opposed tooth flanks forming at least one tooth space of predetermined proportions;
   providing a fixture mountable on said shaft for holding said first gear master part on said shaft, said fixture including locating means thereon;
   mounting said first gear master part on said shaft;
   mounting said fixture on said shaft with said locating means on said fixture in registration with one of said locating means on said shaft and in a tooth space on said first gear master part for locating said first gear master part in a predetermined position with respect to said shaft prior to locating said cutting tool in a tooth space;
   positioning said cutting tool in a tooth space to locate said cutting tool with respect to at least one of said flanks and said shaft for cutting said teeth of one of said gears in predetermined alignment with respect to said shaft; and
   removing said first gear master part and said fixture from said shaft.

23. The method set forth in claim 22 together with the steps of:
   preparing said shaft for cutting another gear thereon by providing a second gear master part having at least one tooth space formed by opposed gear tooth flanks;
   mounting said second gear master part and said fixture on said shaft; and
   locating a tooth space on said second gear master part with respect to said shaft by placing said locating means on said fixture in registration with said tooth space on said second gear master part and with the other of said locating means on said shaft.

24. In the manufacture of gears which are formed on a shaft using a form cutting tool, the method of providing for predetermined alignment of the teeth of one gear with respect to said shaft comprising the steps of:
   providing said shaft with locating means of predetermined dimensions formed on said shaft;
   providing a gear master part having at least one set of opposed tooth flanks forming at least one tooth space of predetermined proportions;
   providing a fixture mountable on said shaft for holding said gear master part on said shaft, said fixture including locating means thereon;
   mounting said gear master part on said shaft;
   mounting said fixture on said shaft with said locating means on said fixture in registration with said locating means on said shaft and in a tooth space for locating said gear master part in a predetermined position with respect to said shaft prior to locating said cutting tool in a tooth space; and
   positioning said cutting tool in a tooth space of said gear master part to locate said cutting tool with respect to at least one of said flanks and said shaft for cutting said teeth of said gear in predetermined alignment with respect to said shaft.

* * * * *